United States Patent
Gover

(10) Patent No.: US 11,511,222 B2
(45) Date of Patent: Nov. 29, 2022

(54) ANTI-CONTAMINATION BAFFLE FOR COOLING AIR SYSTEMS

(71) Applicant: PRATT & WHITNEY CANADA CORP., Longueuil (CA)

(72) Inventor: Christopher Gover, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 496 days.

(21) Appl. No.: 16/541,491

(22) Filed: Aug. 15, 2019

(65) Prior Publication Data

US 2021/0046414 A1  Feb. 18, 2021

(51) Int. Cl.
| B01D 46/24 | (2006.01) |
| B01D 46/00 | (2022.01) |
| F02C 7/18  | (2006.01) |

(52) U.S. Cl.
CPC ......... *B01D 46/24* (2013.01); *B01D 46/0045* (2013.01); *F02C 7/18* (2013.01); *B01D 2273/10* (2013.01); *F05D 2220/323* (2013.01)

(58) Field of Classification Search
CPC ................ B01D 46/24; B01D 46/0045; B01D 2273/10; F02C 7/18; F02C 7/052; F05D 2220/323; F05D 2260/606; F05D 2260/607; F01D 5/081; F01D 25/002
See application file for complete search history.

(56) References Cited

U.S. PATENT DOCUMENTS

| 5,402,636 A    | 4/1995  | Mize et al.          |
| 7,137,777 B2   | 11/2006 | Fried et al.         |
| 7,326,031 B2   | 2/2008  | O'Neill et al.       |
| 2018/0036663 A1* | 2/2018 | Ayar ........................ B04B 1/00 |

* cited by examiner

*Primary Examiner* — Robert Clemente
(74) *Attorney, Agent, or Firm* — Norton Rose Fulbright Canada LLP

(57) ABSTRACT

An aircraft engine cooling air system is configured to provide cooling air to turbine components. The system has an airflow path extending from a source of cooling air to the turbine components. A baffle is disposed in the airflow path upstream of the turbine components. The baffle has a filtering surface defining a plurality of filtering holes sized to trap particulate matter suspended in the cooling air. A bypass passage is fluidly connected to the source of cooling air and the turbine components in parallel with the baffle so as to allow airflow to the turbine components when the filtering holes of the baffle are clogged.

14 Claims, 5 Drawing Sheets

ANTI-CONTAMINATION BAFFLE FOR COOLING AIR SYSTEMS

TECHNICAL FIELD

The application relates generally to aircraft engines and, more particularly, to an anti-contamination baffle for cooling air systems.

BACKGROUND OF THE ART

Modern gas turbine engines operate at temperatures which are above those which many materials are able to withstand unaided. One of the typical solutions used in the aerospace industry to overcome these limitations is the use of cooling air. This cooling air passes around and through hot components removing heat from them and allowing continued, reliable operation in demanding conditions. Due to the impact of removing cooling air from the engine on overall engine performance, the quantity of this cooling air is kept to a minimum with small orifices and narrow cooling passages being common.

During standard operation, these cooling passages are typically sufficient for the purposes required. However, during operation in high contamination environments where large quantities of fine particulate matter is suspended in the surrounding air, these narrow passages can become clogged reducing or even cutting off cooling flow completely. The impact of this can range from engine removal sooner than originally anticipated with associated costs, additional spare part consumption, and potentially part failure.

SUMMARY

In one aspect, there is provided an aircraft engine cooling air system for providing cooling air to turbine components, the aircraft cooling air system comprising: an airflow path extending from a source of cooling air to the turbine components, a baffle disposed in the airflow path upstream of the turbine components relative to a flow of cooling air through the airflow path, the baffle having a filtering surface defining a plurality of filtering holes sized to trap particulate matter suspended in the cooling air, and a bypass passage fluidly connected to the source of cooling air and the turbine components in parallel with the baffle so as to allow airflow to the turbine components when the filtering holes of the baffle are clogged.

In another aspect, there is provided a turbine section of an aircraft engine, the turbine section comprising: a turbine rotor having a set of blades extending from a turbine disc into a gas path; an airflow path in fluid flow communication with a source of cooling air, the airflow path including an inter-stage disc cavity on an upstream side of the turbine rotor; and a baffle mounted in the inter-stage disc cavity, the baffle having a filtering surface configured to capture fine particulate matter suspended in the cooling air. In a further aspect, there is provided.

In accordance with another aspect, there is provided a method for removing fine particulate matter from cooling air in an aircraft engine, the particulate matter suspended in a cooling air flow passing through an airflow path in flow communication with turbine components of the aircraft engine, the method comprising: trapping the fine particulate matter by filtering the cooling air through a filtering surface of a baffle disposed in a rotor cavity.

DESCRIPTION OF THE DRAWINGS

Reference is now made to the accompanying figures in which.

DETAILED DESCRIPTION

Figure 1:
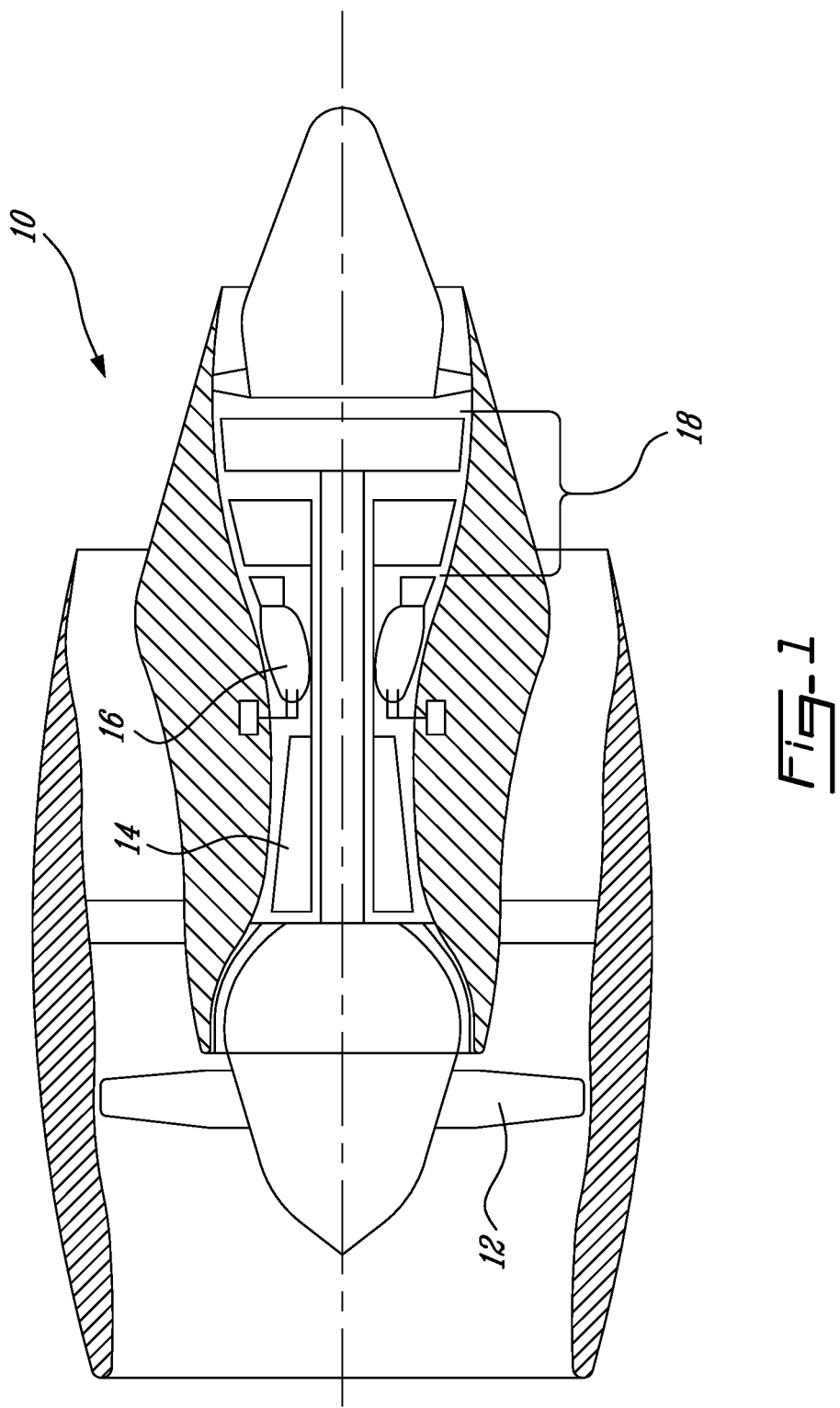
FIG. 1 is a schematic cross-sectional view of a gas turbine engine.

FIG. 1 illustrates an aircraft engine, such as a gas turbine engine 10, of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
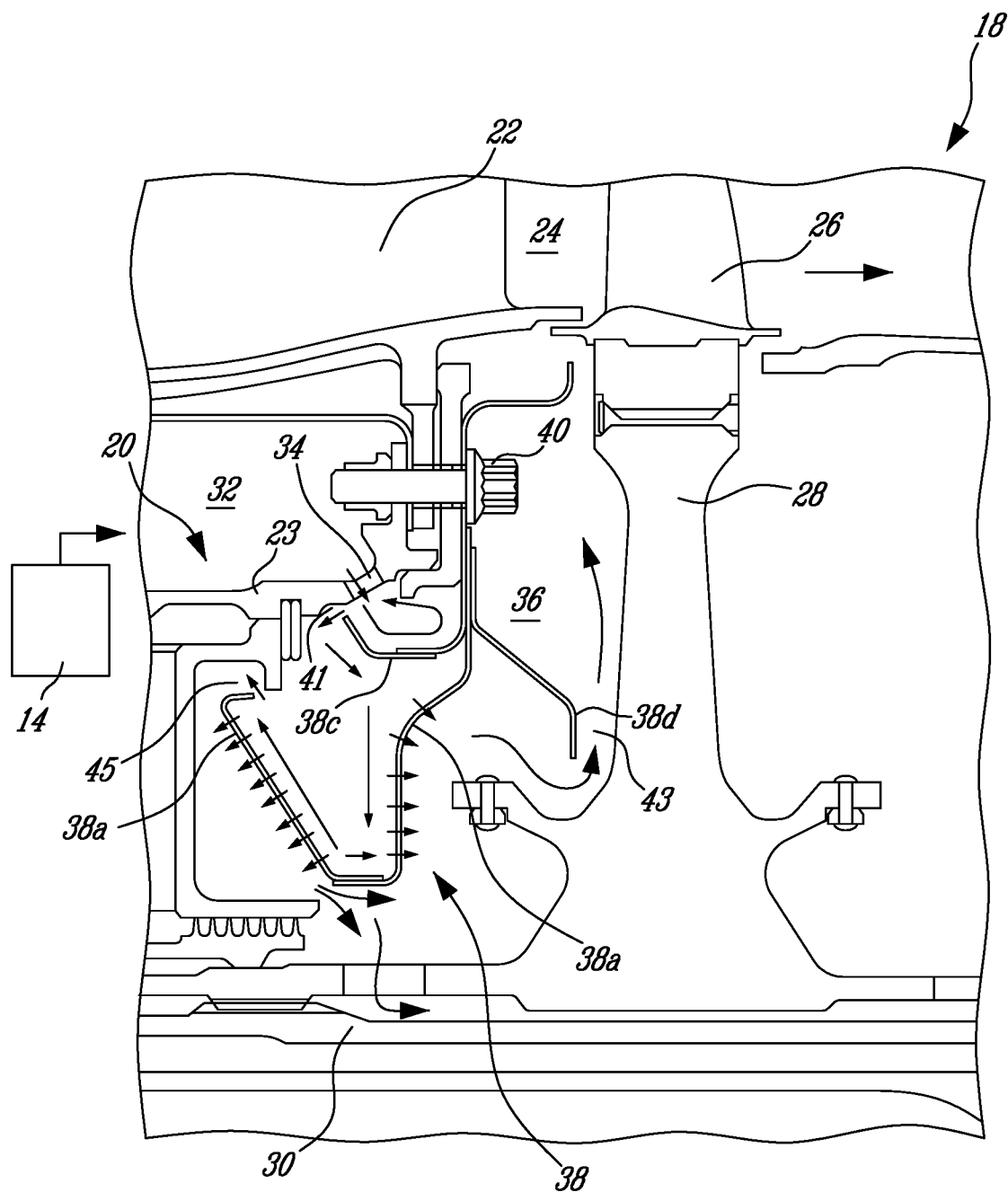
FIG. 2 is a cross-section of a turbine section of the gas turbine engine and illustrating a filtering baffle disposed in a cooling air flow path of a cooling air system.

FIG. 2 is an enlarged cross-section view of a portion of the turbine section 18. The turbine section 18 comprises a circumferential array of stator vanes 22 extending into a gas path 24 for directing combustion gases to an array of turbine blades 26 mounted to a turbine disc 28 drivingly connected to a shaft 30 rotatable about a centerline of the engine 10. Still referring to FIG. 2, it can be appreciated that the engine 10 further comprises an air cooling system 20 for providing cooling air to hot turbine components requiring cooling during engine operation (e.g. the turbine blades 26).

The cooling system 20 comprises an airflow path extending from a cooling air source to the turbine components to be cooled. For instance, the airflow path may comprise a first annular cooling air plenum 32 concentric to and disposed radially inwardly of the gas path 24. The plenum 32 is bounded by an inner wall 23. The plenum 32 may be fed with compressor air bled from the compressor section 14 of the engine 10 or from another suitable cooling air source. An array of circumferentially spaced-part cooling air source orifices 34 (one being shown) is defined in the wall 23 to direct cooling air from the first plenum 32 to a second annular plenum 36 concentric to the first annular plenum 32. The cooling air source orifices 34 are provided to meter the quantity of cooling air fed to the sensitive turbine components to be cooled. According to the illustrated embodiment, the second plenum 36 is a rotor cavity and, more particularly, an inter-stage disc cavity defined axially between stator vanes 22 and rotor blades 26 and radially inwardly of the gas path 24. As shown by the flow arrows in FIG. 2, cooling air can be fed from the first plenum 32 into the second plenum 36 via orifices 34 to provide cooling air to the shaft 30, the turbine disc 28, the turbine blades 26 and other sensitive turbine components requiring cooling.

The cooling system 20 further comprises a baffle 38 disposed upstream of the sensitive components to be cooled (e.g. the turbine blades 26, the turbine disc 28 and the shaft 30) relative to a flow of cooling air through the cooling system. While FIG. 2 shows the baffle 38 mounted in the second plenum 36 downstream of the cooling air source orifices 34, it is understood that the baffle 38 could be located upstream of the orifices 34. In the illustrated embodiment, the baffle 38 is removably mounted to the vane support 23 via appropriate fasteners, such as nut and bolt assemblies 40.

Figure 3:
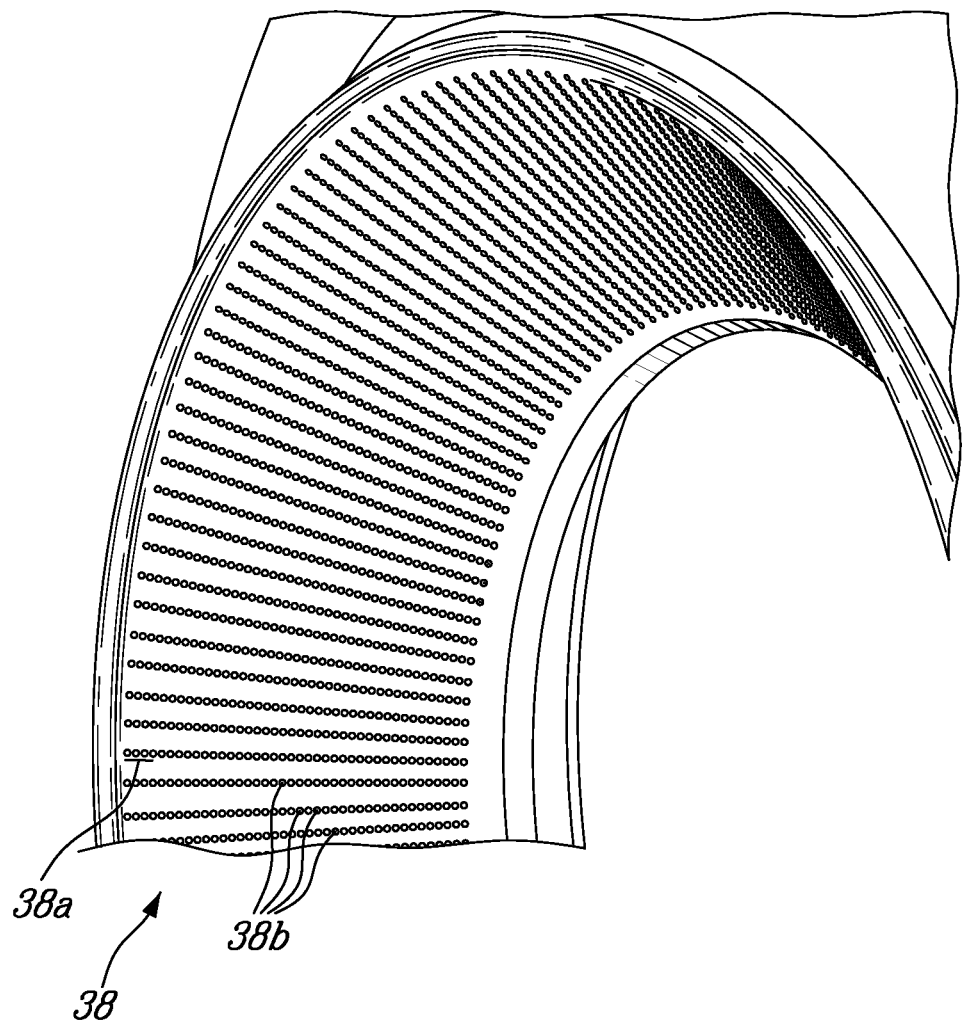
FIG. 3 is an isometric view of the filtering baffle of the cooling air system.

Referring concurrently to FIGS. 2 and 3, it can be appreciated that the baffle 38 has a filtering surface 38*a* defining a plurality of filtering holes 38*b* through which the air can pass and the fine particulate matter suspended in the air can become trapped. In this way, the filtering surface 38*a* of the baffle 38 can be used to mechanically capture the fine particulate matter that may be contained in the air so as to reduce the suspended particle count prior to the air being supplied to the sensitive components. By installing such a filtering baffle upstream of the sensitive turbine components, the air which reaches the fine cooling holes of the sensitive components will have a reduction in the suspended particle count. In this way, it is possible to reduce the rate of particulate accumulation within the cooling passages of the turbine sensitive components particularly for aircraft engines operating in high contamination level environments.

To ensure the largest amount of particle contamination is collected, the filtration surface area of the baffle 38 is made as large as possible with a large number of holes. For the purposes of this disclosure, fine particulate matter could be defined as particulates which have a major dimension as less than or equal to the diameter of the holes (0.010"). The diameter of the holes 38*b* can range from 0.010" to 0.025". The density of holes is dependent on the structural requirements of the baffle. According to one embodiment, the holes 38*b* are spaced a distance of twice the diameter of the holes between hole centerlines.

As shown in FIG. 2, the baffle 38 can have a U or V-shaped portion so as to define an annular channel or gutter-like structure for receiving the contaminated air discharged from the orifices 34. The filtering surface 38*a* can be provided on both legs of the U or V-shaped portion of the baffle 38. Accordingly, in operation, the cooling air discharged from the orifices 24 will flow forwardly through the front or first perforated filtering leg as well as rearwardly through the second or rear perforated filtering leg of the baffle 38. According to one embodiment, the baffle 38 and its legs is made from folded perforated sheet metal. The legs can be of unitary construction or assembled from individual components, such as by welding or brazing. In the illustrated embodiment, the rear filtering leg of the baffle 38 is mounted to the wall 23 via bolt and nut assemblies 40 while the front filtering leg projects in a cantilevered fashion from the radially inner end of the rear filtering leg. Bents can be provided in the front and rear legs to improve the structural integrity thereof and/or to redirect the flow as desired.

The filtering legs of the baffle 38, and indeed the baffle itself could also be constructed using additional methods of manufacture and/or materials including: composites, additive manufacturing, thermoplastics, machined from solid, etc.

As shown in FIG. 2, the rear leg of the baffle 38 can include flow diverting appendices 38*c*, 38*d*. For instance, in the illustrated example, the rear filtering leg of the baffle 38 has a forwardly projecting appendix 38*c* and a rearwardly projecting appendix 38*d*. Both appendices are annular. Still according to the illustrated example, the forward and rearward baffle appendices 38*c*, 38*d* are not perforated. They may be configured and disposed to cause the cooling air stream to make a sudden change of direction. In this way, the large-diameter particles/contaminants will not follow the air stream but settle.

According to the illustrated embodiment, the forward appendix 38*c* is aligned and adjacent to the circumferential array of orifices 34 so as to form an inlet sub-chamber for receiving cooling air from the orifices 34. The forward appendix 38*c* can be curved to cause the incoming flow of cooling air to swirl or flow along a loop pattern (see flow arrows in FIG. 2) prior to reaching the perforated filtering surface 38*a* of the baffle 38. The distal end of the forward appendix 38*c* is spaced radially inwardly from the support structure 23 so as to define therewith an annular passage 41 upstream of the filtering surface 38. The cooling air discharged from the orifices 34 is, thus, constrained to swirl in the inlet sub-chamber prior to be discharged between the front and rear filtering legs of the baffle 38 via the annular passage 41.

The rearward baffle appendix 38*d* is disposed downstream of the filtering surface 38*a* to further deflect and regulate the cooling air flow prior it reaches the turbine blades 26. The rearward baffle appendix 38*d* cooperates with the forwardly facing surface of the hub of the turbine disc 28 to define a constricted flow passage 43 upstream of the turbine blades 26. According to various embodiments, filtering holes could also be provided in the annular appendices 38*c* and 38*d*.

Figure 4:
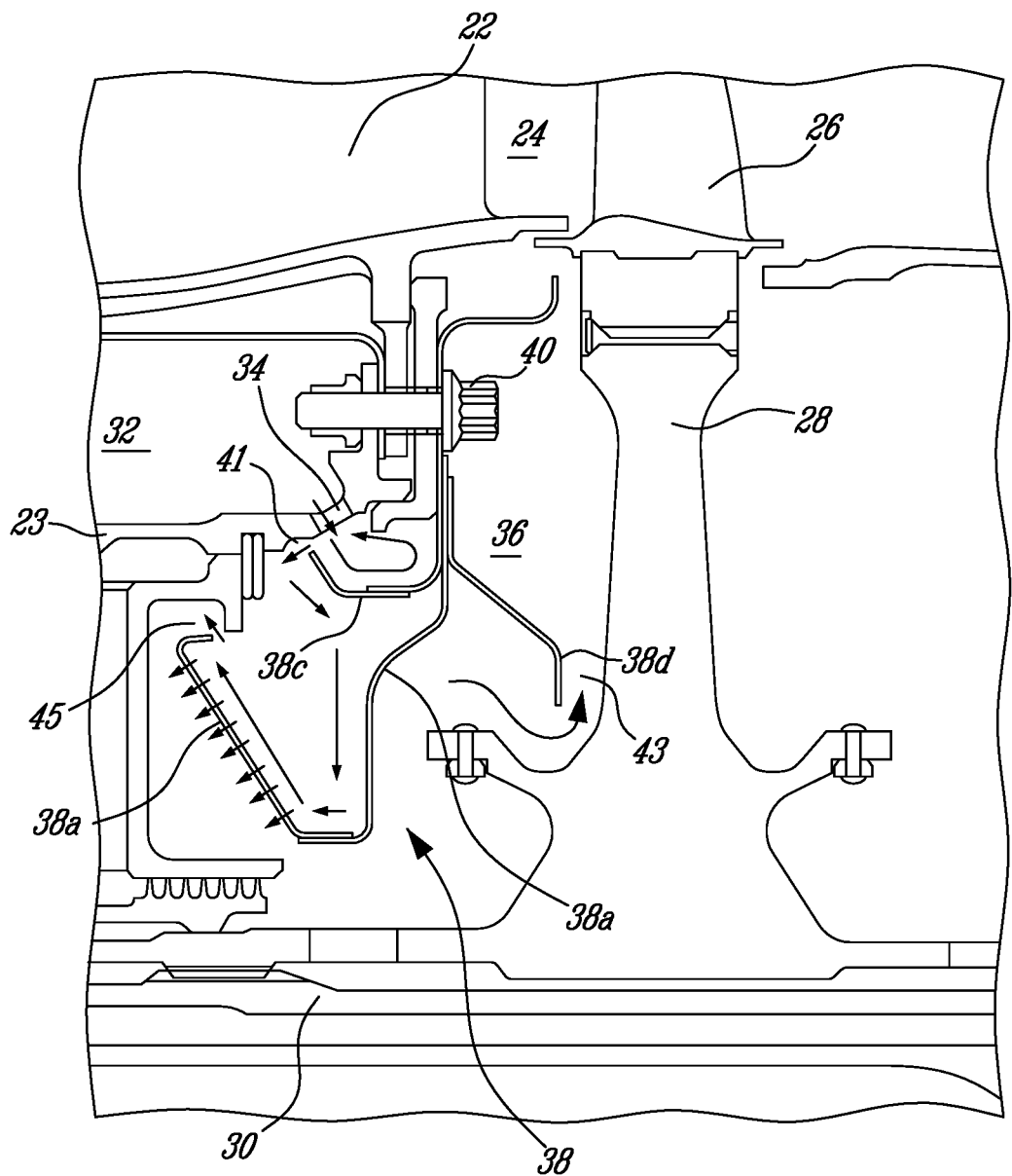
FIG. 4 is a cross-section view similar to FIG. 2 but illustrating the air flow path in a partially blocked/dirty state.
Figure 5:
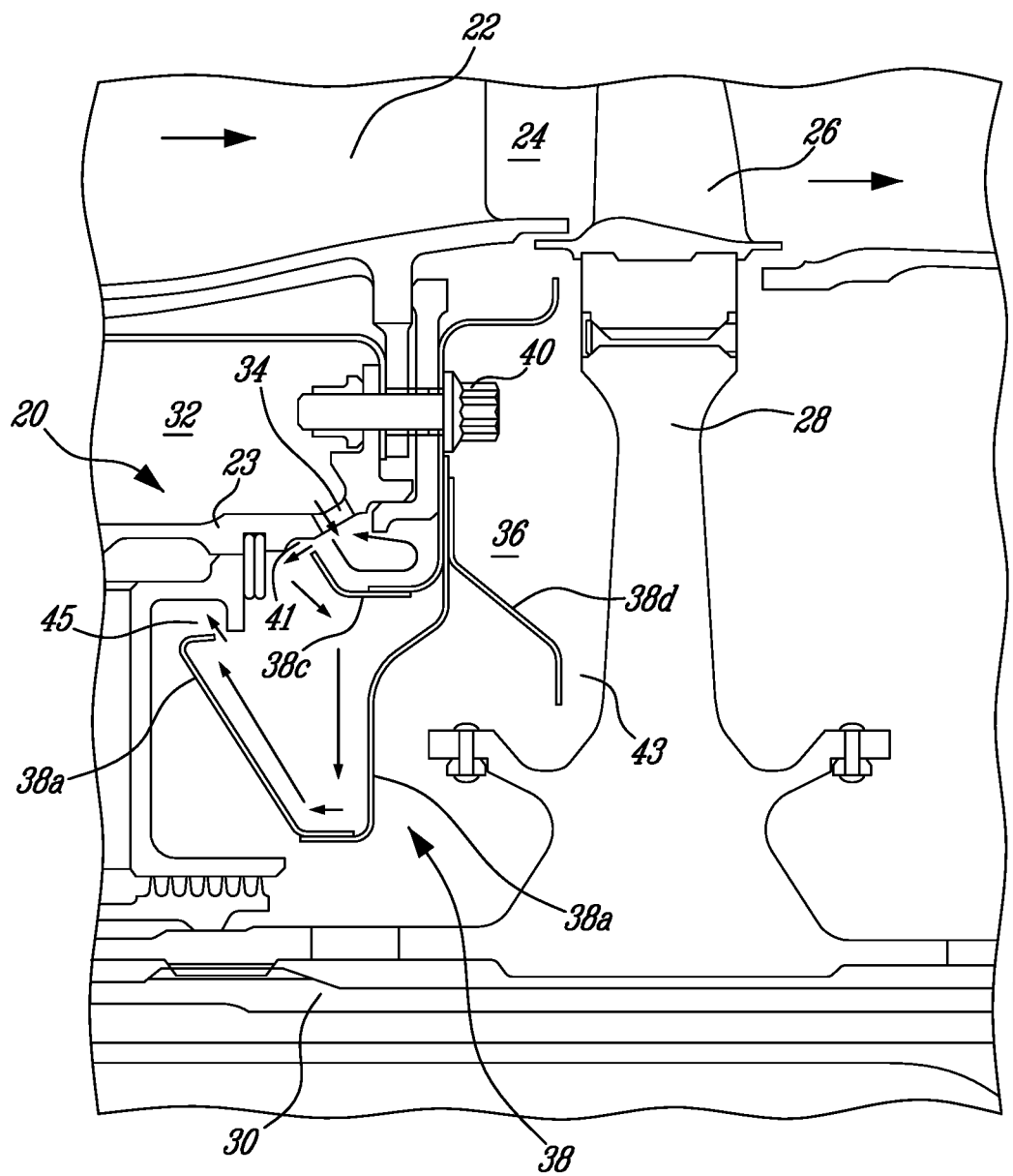
FIG. 5 is a cross-section view similar to FIGS. 2 and 4 but illustrating the air flow path in a fully blocked/dirty state showing function of failure mode bypass.

As can be appreciated from FIGS. 2, 4 and 5, the cooling system 20 as a failure mode bypass to prevent the baffle 38 from completely blocking the required cooling air once the baffle's holes 38*b* are blocked by the particulate matter captured on the filtering surface 38*a* of the baffle 38. The bypass can take the form of a static bypass passage 45 which remains open irrespective of the state of the filtration surface 38*a*. For instance, the distal end of the front leg of the baffle 38 can extend close to an adjacent front wall of the secondary plenum 36 so as to define an annular bypass passage 45 to allow at least a portion of the air discharged in the second plenum 36 to bypass the filtering surface 38*a*. The flow area defined by the bypass passage 45 is equal to or greater than the total flow area of the cooling flow orifices 34. Accordingly, the quantity of cooling air supplied to the sensitive turbine components is controlled/limited by the orifices 34 not by the filtering baffle 38.

FIG. 2 illustrates the airflow path in a clean state. It can be appreciated that the majority of the air will flow through the filtering surface 38*a* on the front and rear legs of the baffle 38 with only a small portion of the air flowing through the bypass passage 45. FIG. 4 illustrates the airflow path in a partially blocked sate where the filtering surface 38*a* on the rear leg of the baffle 38 is fully blocked. In this state, the air will flow through the front filtering leg of the baffle 38 as well as through the bypass passage 45. FIG. 5 shows the airflow path in a fully blocked/dirty state. In this state, all the air will flow through the bypass passage 45 thereby bypassing the filtering surface 38*a* to prevent starvation and damage. It is understood that the bypass passage 45 is sized to avoid becoming clogged by the fine particulate matter suspended in the contaminated cooling air and, thus, ensure a continuous supply of cooling air to sensitive components when the filtering surface 38*a* is blocked.

When need be, the baffle 38 can be removed from the engine 10 to be cleaned before being reinstalled in position.

In view of the foregoing, it can be appreciated that fine particulate matter can be removed from a cooling air flow in an aircraft engine by trapping the fine particulate matter on a filtering surface of a baffle disposed in the airflow path upstream turbine components to be cooled. The mechanical capture of the particulate matter allows to effectively reducing the rate of accumulation of particulate matter in the fine cooling passages of sensitive engine components.

In accordance with one or more embodiments, there is provided a baffle configured to reduce the suspended particle count in a flow of cooling air through the use a plurality of fine filtering holes through which the air can pass and the particles can become trapped. By installing the baffle upstream of sensitive components to be cooled, the air which reaches the fine cooling holes of the sensitive component will have a reduction in the suspended particle count. When detailed maintenance is performed on the engine (e.g. hot section inspection, overhaul), the baffle can be removed from the engine and cleaned to remove the collected dust.

The above description is meant to be exemplary only, and one skilled in the art will recognize that changes may be made to the embodiments described without departing from the scope of the invention disclosed. For example, ridges, dimples, surface roughness or any combination thereof could be used on the baffle to help the capture of the particular matter. Still other modifications which fall within the scope of the present invention will be apparent to those skilled in the art, in light of a review of this disclosure, and such modifications are intended to fall within the appended claims.

The invention claimed is:

1. An aircraft engine cooling air system for providing cooling air to turbine components, the aircraft engine cooling air system comprising: an airflow path extending from a source of cooling air to the turbine components, a baffle disposed in the airflow path upstream of the turbine components relative to a flow of cooling air through the airflow path, the baffle having a filtering surface defining a plurality of filtering holes sized to trap particulate matter suspended in the cooling air, and a bypass passage fluidly connected to the source of cooling air and the turbine components in parallel with the baffle so as to allow airflow to the turbine components when the filtering holes of the baffle are clogged, wheerein the baffle has first and second legs defining an annular channel therebetween for receiving the cooling air, the filtering surface being provided on both said first and second legs.

2. The aircraft engine cooling air system of claim 1, wherein the bypass passage remains always open.

3. The aircraft engine cooling air system of claim 1, wherein the bypass passage is defined between a distal end of the baffle and a wall of the airflow path.

4. The aircraft engine cooling system of claim 1, wherein the baffle is mounted in an inter-stage disc cavity between a turbine stator and turbine rotor.

5. The aircraft engine cooling system of claim 1, wherein the baffle has a first baffle appendix projecting from the second leg into the airflow path upstream of the filtering surface.

6. The aircraft engine cooling system of claim 5, wherein the first baffle appendix is configured to redirect the cooling air from a first direction to a second direction before being supplied to the filtering surface.

7. The aircraft engine cooling system of claim 6, wherein the first baffle appendix is configured to induce a swirl-like motion to the cooling air.

8. The aircraft engine cooling system of claim 5, wherein the baffle has a second baffle appendix projecting from the second leg into the airflow path downstream of the filtering surface.

9. The aircraft engine cooling system of claim 5, wherein the first baffle appendix has a distal end cooperating with a wall of the airflow path to define an annular passage for discharging the cooling air between the first and second legs of the baffle.

10. A turbine section of an aircraft engine, the turbine section comprising:
a turbine rotor having a set of blades extending from a turbine disc into a gas path; an airflow path in fluid flow communication with a source of cooling air, the airflow path including an inter-stage disc cavity on an upstream side of the turbine rotor; a baffle mounted in the inter-stage disc cavity, the baffle having a filtering surface having a plurality of filtering holes configured to capture fine particulate matter suspended in the cooling air, and a bypass passage defined between the baffle and an adjacent wall surfce of the interstage disc cavity, wherein the baffle has first and second legs defining an annular channel therebetween for receiving the cooling air, the filtering surface being provided on both said first and second legs.

11. The turbine section of claim 10, wherein the baffle has a first baffle appendix projecting from the second leg into the inter-stage disc cavity upstream of the filtering surface.

12. The turbine section of claim 11, wherein the first baffle appendix is configured to redirect the cooling air from a first direction to a second direction before being supplied to the filtering surface.

13. The turbine section of claim 11, wherein the first baffle appendix is configured to cause the cooling air to swirl.

14. The turbine section of claim 11, wherein the baffle has a second baffle appendix projecting from the second leg into inter-stage disc cavity downstream of the filtering surface.

* * * * *